G. CATTANEO.
COOLING ARRANGEMENT FOR EXHAUST VALVES OF INTERNAL COMBUSTION ENGINES.
APPLICATION FILED MAR. 26, 1919.
1,343,111. Patented June 8, 1920.
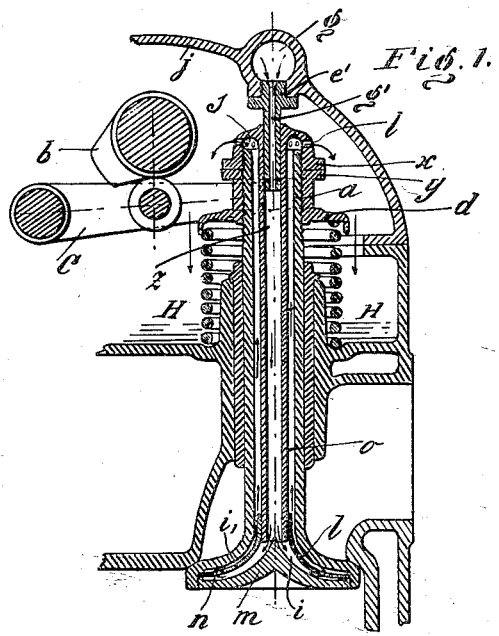
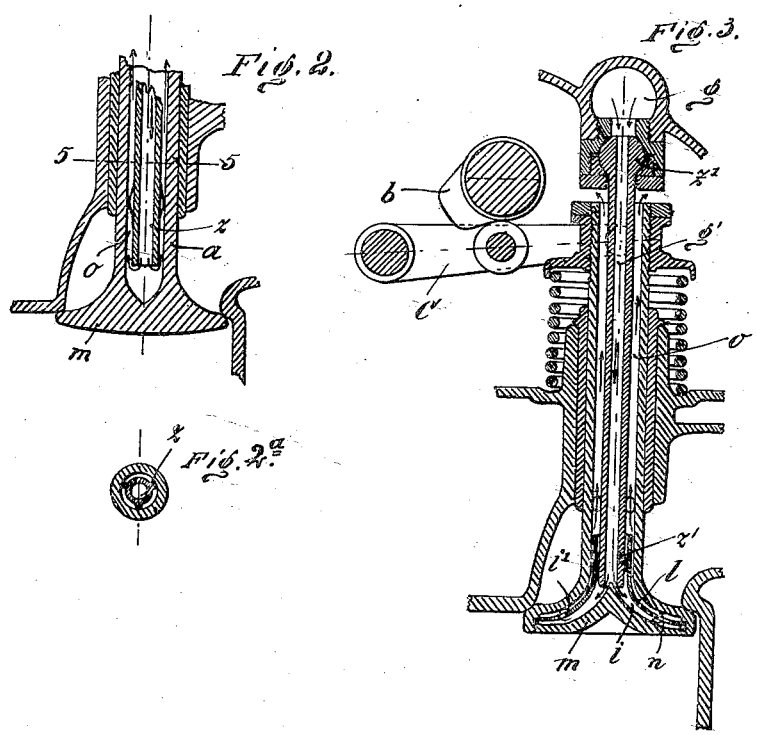
Inventor.
G. Cattaneo
By H. R. Kerslake
Atty.

UNITED STATES PATENT OFFICE.

GIUSTINO CATTANEO, OF MILAN, ITALY.

COOLING ARRANGEMENT FOR EXHAUST-VALVES OF INTERNAL-COMBUSTION ENGINES.

1,343,111.      Specification of Letters Patent.      Patented June 8, 1920.

Application filed March 26, 1919. Serial No. 285,328.

*To all whom it may concern:*

Be it known that I, GIUSTINO CATTANEO, employee, subject of the King of Italy, resident of Milan, in the Kingdom of Italy, No. 79 Via Monte Rosa, have invented new and useful Improvements in Cooling Arrangements for Exhaust-Valves of Internal-Combustion Engines, of which the following is a specification.

In the arrangement described and illustrated in my prior application No. 231283 the case is considered in which the cooling of the exhaust valve is obtained by circulating oil through the intermediate member of the valve controlling gear.

In the annexed drawing which represents an alternative way of carrying the new arrangement into effect;

Figure 1 is a sectional view of a head cylinder having the improved valve.

Figs. 2 and 2$^a$ show in sectional elevation and cross section a valve head.

Fig. 3 shows an alternative construction.

The valve controlling is done by a lever —c—, actuated by the cam —b—, which imparts the valve opening and closing motion through a collar —y—d— screwed on the valve spindle. By this arrangement the oil circulation inside the hollow spindle of the valve can be effected directly, as may be seen from Figs. 1 and 3.

In the cover —j— inclosing the valve controlling gear —a— duct —g— is provided to which pressure oil can be supplied by any suitable pump.

According to Fig. 1 the oil passes from the duct —g— to the valve through the nozzle —g'—. Inside the hollow valve-spindle is centered a pipe —z—, this pipe being solid with the counter-nut —x—. The nozzle —g'— is a tight fit in the pipe —z—, so that from the duct —g— the oil flows down the pipe —z—, passes into the channel —i— and finally through holes —n— into the channel —i— thus cooling the valve-head —m— and valve spindle.

The oil passes through —o— and the discharge takes place through the annular duct —s— and perforation —l— into the tank H, from whence, after having been conveniently cooled down, the oil can be set into circulation again by the circulation pump.

Fig. 3 illustrates an alternative method by which the oil can be led from duct —g— to the hollow valve spindle. In this arrangement the nozzle —g'— extends down to the valve bottom at 6, from whence the oil circulates exactly in the same manner as in Fig. 1 and is finally directly discharged at the top end of the valve.

In order to allow of the pipe —z— being centered without forcing the valve, the nozzle may be connected to the duct —g— by means of a ball joint, as shown in the figure at —z'—.

In both cases the oil circulation can be limited to the valve spindle (instead of being extended to the valve head), as shown in Fig. 2.

In both cases the valve opening and closing motions do not interfere with the oil circulation at all, on the contrary they even can render it more active since, owing to the reciprocating motion of the valve, the volume of the space —g— varies from a minimum when the valve is closed to a maximum when the valve is open.

This volume variation of the duct —c— can be improved to produce the oil circulation, thus dispensing with the oil circulation pump.

Of course the constructional details and those concerning the form of the various parts may be varied from those described and illustrated without departing from the spirit and scope of the invention.

Having now described my invention and how the same is to be carried out, what I claim as my invention is:

1. An exhaust valve cooling arrangement for internal combustion engines including in combination, a casing forming a chamber and a cover, a hollow valve composed of a head and a stem slidably arranged through the chamber, a duct in the cover, a nozzle connected with the duct, a central pipe coaxial within the valve stem and operatively connected with the nozzle, a funnel-shaped diaphragm on the lower end of the pipe and suspended substantially at mid height within the valve head so as to divide the head into two superimposed compartments, the upper of which communicates with the chamber, while the lower communicates with the central pipe, and the diaphragm being provided with openings for establishing communication between the upper and lower compartments in the valve head.

2. An exhaust valve cooling arrangement for internal combustion engines including in combination, a casing forming a chamber and a cover, a hollow valve composed of a head and a stem slidably arranged through the chamber, a duct in the cover, a nozzle member connected with the duct, a central pipe coaxial with the valve stem and loosely fitted therein and having a spherical upper end universally connected with the nozzle member, ribs projected from the central pipe to maintain said pipe centered inside of the valve stem and a funnel shaped diaphragm carried by the lower end of the pipe and positioned within the valve head to provide superimposed compartments therein and also being provided with openings for establishing communication between the compartments.

3. An exhaust valve cooling arrangement for internal combustion engines including in combination, a casing forming a chamber and a cover, a hollow valve composed of a head and a stem slidable through the chamber, a duct in the cover, a nozzle member connected with the duct, a central pipe coaxial with the valve stem and loosely fitted therein and having the upper end universally connected with the nozzle member, ribs projecting from the central pipe for maintaining the pipe centered inside of the valve stem and the hollow valve head receiving the cooling fluid from the inner bore of the central pipe and passing it between the central pipe and the valve stem to the chamber.

GIUSTINO CATTANEO.